(12) United States Patent
Cheng et al.

(10) Patent No.: US 12,430,814 B2
(45) Date of Patent: Sep. 30, 2025

(54) IMAGE GENERATION METHOD AND APPARATUS, AND STORAGE MEDIUM

(71) Applicants: SENSETIME GROUP LIMITED, Hong Kong (CN); HONDA MOTOR CO., LTD., Tokyo (JP)

(72) Inventors: Guangliang Cheng, Hong Kong (CN); Jianping Shi, Hong Kong (CN); Yuji Yasui, Tokyo (JP); Hideki Matsunaga, Tokyo (JP); Kaname Tomite, Tokyo (JP)

(73) Assignees: SENSETIME GROUP LIMITED, Hong Kong (CN); HONDA MOTOR CO., LTD., Tokyo (JP)

( * ) Notice: Subject to any disclaimer, the term of this patent is extended or adjusted under 35 U.S.C. 154(b) by 177 days.

(21) Appl. No.: 18/474,189

(22) Filed: Sep. 25, 2023

(65) Prior Publication Data
US 2024/0013453 A1   Jan. 11, 2024

Related U.S. Application Data

(63) Continuation of application No. PCT/CN2022/074059, filed on Jan. 26, 2022.

(30) Foreign Application Priority Data

Mar. 31, 2021   (CN) .......................... 202110351943.9

(51) Int. Cl.
*G06T 11/00*   (2006.01)
*G06T 5/40*   (2006.01)
*G06T 5/77*   (2024.01)

(52) U.S. Cl.
CPC .............. *G06T 11/00* (2013.01); *G06T 5/40* (2013.01); *G06T 5/77* (2024.01); *G06T 2207/20081* (2013.01); *G06T 2207/20084* (2013.01)

(58) Field of Classification Search
CPC . G06T 2207/20084; G06T 2207/20081; G06T 5/40; G06T 5/77; G06T 11/00; G06T 5/94; G06T 3/04; G06T 7/11
See application file for complete search history.

(56) References Cited

U.S. PATENT DOCUMENTS 6,873,327 B1 * 3/2005 Edwards ................. G06T 11/60
                                                      345/473
7,295,716 B1 * 11/2007 Chinen ................ H04N 1/6086
                                                      358/509

(Continued)

FOREIGN PATENT DOCUMENTS

CN    102136132 A    7/2011
CN    106327454 A    1/2017

(Continued)

OTHER PUBLICATIONS

International Search Report in the international application No. PCT/CN2022/074059, mailed on Apr. 1, 2022, 3 pages.

(Continued)

*Primary Examiner* — Phi Hoang
(74) *Attorney, Agent, or Firm* — SYNCODA LLC; Feng Ma

(57) ABSTRACT

An image generation method includes: an original image is converted into an image to be processed under a specific scenario; in the image to be processed, a region to be adjusted of which image rendering state does not match scenario information of the specific scenario is determined; the image rendering state of the region to be adjusted is related to light illuminated on a target object in the original image, and the target object includes a vehicle; a target rendering state in the region to be adjusted is determined; the target rendering state matches the scenario information; and in the image to be processed, the image rendering state of the (Continued)

region to be adjusted is adjusted to the target rendering state, to obtain a target image.

16 Claims, 9 Drawing Sheets

(56) References Cited

U.S. PATENT DOCUMENTS

| | | | |
|---|---|---|---|
| 8,406,519 B1* | 3/2013 | Lim | G06T 11/00 |
| | | | 382/170 |
| 10,885,701 B1 | 1/2021 | Patel | |
| 2020/0066030 A1 | 2/2020 | Naik et al. | |
| 2020/0288067 A1* | 9/2020 | Watazawa | G06V 10/60 |
| 2021/0118112 A1 | 4/2021 | Huang | |
| 2021/0295571 A1* | 9/2021 | Sun | G06T 5/94 |
| 2022/0327769 A1* | 10/2022 | Tsai | G06N 3/084 |
| 2023/0088801 A1* | 3/2023 | Lawrence | G06N 3/08 |
| | | | 348/164 |
| 2023/0206568 A1* | 6/2023 | Du | G06T 7/50 |
| | | | 345/426 |

FOREIGN PATENT DOCUMENTS

| | | |
|---|---|---|
| CN | 109377502 A | 2/2019 |
| CN | 109887066 A | 6/2019 |
| CN | 110264413 A | 9/2019 |
| CN | 110490960 A | 11/2019 |
| CN | 111260769 A | 6/2020 |
| CN | 111583097 A | 8/2020 |
| CN | 111951157 A | 11/2020 |
| CN | 112419328 A | 2/2021 |
| CN | 112991158 A | 6/2021 |
| JP | 2010033321 A | 2/2010 |
| JP | 2015149611 A | 8/2015 |
| JP | 2016072694 A | 5/2016 |
| JP | 2017016663 A | 1/2017 |
| JP | 2017152866 A | 8/2017 |
| WO | 2016054800 A1 | 4/2016 |
| WO | 2020220807 A1 | 11/2020 |

OTHER PUBLICATIONS

English translation of the Written Opinion of the International Search Authority in the international application No. PCT/CN2022/074059, mailed on Apr. 1, 2022, 6 pages.

Satoru Nakanishi et al, "Deep Photo Relighting: Changing lighting conditions for free viewpoint images using deep learning", Research Report Audiovisual Complex Information Processing (AVM), Feb. 27, 2018, vol. 2018-AVM-100, No. 3, pp. 1-6.

Yohei Ogura et al, "Illumination Estimation and Relighting based on Normal Map from an RGB-D Camera", IPSJ SIG Technical Report, Jan. 15, 2015, vol. 2015-CVIM-195 No. 32, pp. 1-4.

* cited by examiner

IMAGE GENERATION METHOD AND APPARATUS, AND STORAGE MEDIUM

CROSS-REFERENCE TO RELATED APPLICATIONS

This is a continuation of International Application No. PCT/CN2022/074059 filed on Jan. 26, 2022, which claims priority to Chinese Patent Application No. 202110351943.9 filed on Mar. 31, 2021. The disclosures of the above-referenced applications are hereby incorporated by reference in their entirety.

BACKGROUND

In image generation methods in some implementations, when a road scenario image acquired at the daytime is required to be converted into a night scenario image by means of style conversion, since there are shadows in the image acquired at the daytime, there are also shadows in the converted image. The authenticity of the generated image is low.

SUMMARY

Embodiments of the disclosure relate to the technical field of image processing, and further relate, but are not limited, to an image generation method and apparatus, and a storage medium.

Embodiments of the disclosure provide an image generation technical solution.

The technical solutions of the embodiments of the disclosure are implemented by means of the following operations.

An embodiment of the disclosure provides an image generation method. The method includes the following operations. An original image is converted into an image to be processed under a specific scenario. In the image to be processed, a region to be adjusted of which image rendering state does not match scenario information of the specific scenario is determined. The image rendering state of the region to be adjusted is related to light illuminated on a target object in the original image, and the target object includes a vehicle. A target rendering state in the region to be adjusted is determined. The target rendering state matches the scenario information. In the image to be processed, the image rendering state of the region to be adjusted is adjusted to the target rendering state, to obtain a target image.

An embodiment of the disclosure provides an image generation apparatus. The apparatus includes a memory storing processor-executable instructions; and a processor. The processor is configured to execute the stored processor-executable instructions to perform operations of: converting an original image into an image to be processed under a specific scenario; determining, in the image to be processed, a region to be adjusted of which image rendering state does not match scenario information of the specific scenario, wherein the image rendering state of the region to be adjusted is related to light illuminated on a target object in the original image, and the target object comprises a vehicle; determining a target rendering state in the region to be adjusted, wherein the target rendering state matches the scenario information; and adjusting, in the image to be processed, the image rendering state of the region to be adjusted to the target rendering state, to obtain a target image.

Correspondingly, an embodiment of the disclosure provides a non-transitory computer-readable storage medium having stored thereon computer-executable instructions that, when executed by a processor, cause the processor to implement operations of: converting an original image into an image to be processed under a specific scenario; determining, in the image to be processed, a region to be adjusted of which image rendering state does not match scenario information of the specific scenario, wherein the image rendering state of the region to be adjusted is related to light illuminated on a target object in the original image, and the target object comprises a vehicle; determining a target rendering state in the region to be adjusted, wherein the target rendering state matches the scenario information; and adjusting, in the image to be processed, the image rendering state of the region to be adjusted to the target rendering state, to obtain a target image.

BRIEF DESCRIPTION OF THE DRAWINGS

Drawings are incorporated into the specification and constitute a part of the specification. The drawings illustrate embodiments in accordance with the embodiments of the disclosure and serve to describe the technical solutions of the embodiments of the disclosure together with the specification.

DETAILED DESCRIPTION

Term "first/second/third" involved is only for distinguishing similar objects and does not represent a specific sequence of the objects. It can be understood that "first/second/third" may be interchanged to specific sequences or orders if allowed to implement the embodiments of the disclosure described in some embodiments in sequences except the illustrated or described ones in some embodiments.

Unless otherwise defined, all technical and scientific terms in the specification have the same meaning as those skilled in the art, belonging to the disclosure, usually understand. Terms used in the specification are only used for describing the purpose of the disclosure, but not intended to limit the disclosure.

Before the embodiments of the disclosure are further described in detail, the nouns and terms involved in the embodiments of the disclosure are described, and the nouns and terms involved in the embodiments of the disclosure are suitable for the following explanations.
1) Gaussian Blur: A low-pass filter for an image. The so-called "blur" may be understood as taking an average value of surrounding pixels for each pixel.
2) Ego vehicle: a vehicle that includes a sensor for sensing ambient environments. A vehicle coordinate system is fixed connected to the ego vehicle, where an x axis is a forward direction of an automobile, a y axis points to the left side of the forward direction of the vehicle, and a z axis towards upward and is perpendicular to the ground, conforming to a right-hand coordinate system. The origin of the coordinate system is on the ground below the midpoint of a rear axle.

The exemplary application of an image generation device provided in an embodiment of the disclosure is described below. The device provided in this embodiment of the disclosure may be implemented as various types of user terminals such as a notebook computer, a tablet computer, a desktop computer, a camera, or a mobile device (for example, a personal digital assistant, a special message device, and a portable game device) having image acquisition functions, or may be implemented as a server. The exemplary application is described below when the device is implemented as a terminal or a server.

The method is applicable to a computer device. Functions achieved by the method may be implemented by using a program code invoked by a processor in the computer device. Definitely, the program code may be stored in a computer storage medium, and it can be seen that the computer device includes at least the processor and the storage medium.

Figure 1A:
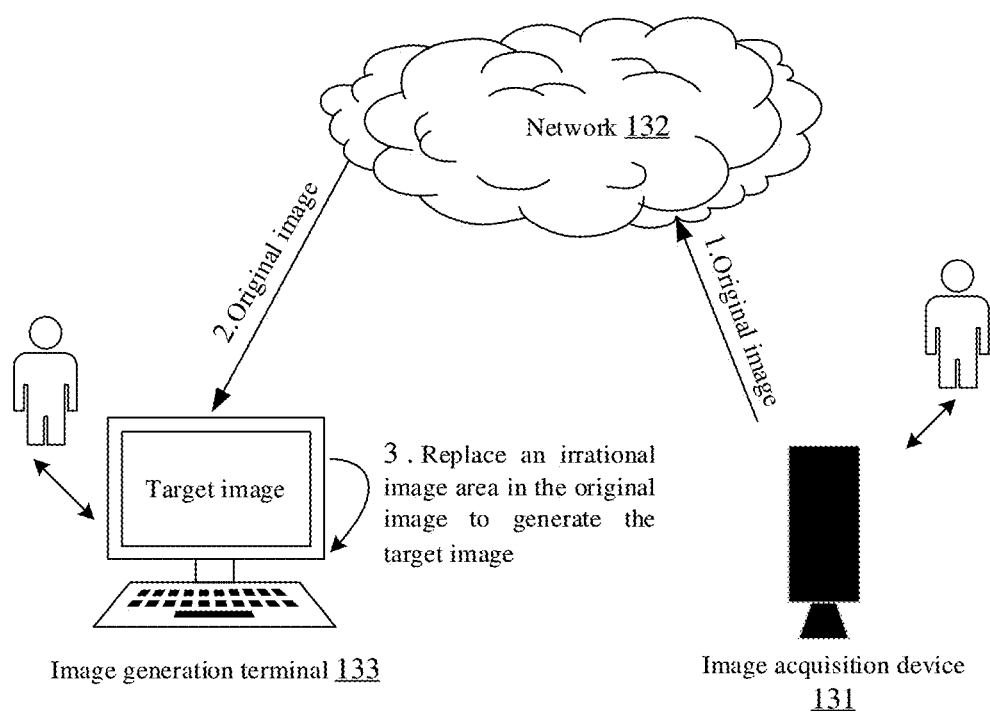
FIG. 1A is a schematic diagram of a system architecture of a trajectory prediction method according to an embodiment of the disclosure.

FIG. 1A is a schematic diagram of a system architecture of an image generation method according to an embodiment of the disclosure. As shown in FIG. 1A, the system architecture includes an image acquisition device 131, a network 132 and an image generation terminal 133. In order to support the exemplary application, the image acquisition device 131 may be communicatively connected to the image generation terminal 133 by means of the network 132. The image acquisition device 131 reports an acquired original image to the image generation terminal 133 by means of the network 202 (or, the image generation terminal 133 automatically acquires the original image). In response to the received original image, the image generation terminal 133 first converts the image into an image to be processed under a specific scenario, determines an irrational region to be adjusted in the image to be processed, determines a target rendering state of the region to be adjusted, adjusts the image rendering state of the region to be adjusted to the target rendering state, to obtain a target image, and outputs the target image on an image display interface of the image generation terminal 133. Therefore, the operation state of an object in the target image matches the scenario information, so that the generated target image can be more in line with a real scenario.

As an example, the image acquisition device 131 may be a acquisition device including a camera. The image generation terminal 133 may include a computer device with certain computing power. The computer device includes, for example, a terminal device, a server, or other processing devices. The network 132 may use a wired or wireless connection mode. When the image generation terminal 133 is the server, the image acquisition device 131 may be communicatively connected to the server in a wired manner, for example, achieving data communication by using a bus. When the image generation terminal 133 is the terminal device, the image acquisition device 131 may be communicatively connected to the image generation terminal 133 by means of a wireless connection mode for data communication.

Alternatively, in some scenarios, the image generation terminal 133 may be a visual processing device having a video capture module, or may be a host having a camera. In this case, the image generation method in this embodiment of the disclosure may be performed by the image generation terminal 133. The system architecture may not include the network 132 and the image acquisition device 131.

In order to make objectives, technical solutions, and advantages of the embodiments of the disclosure clearer, the specific technical solutions of the present invention are further described in detail below with reference to the drawings in the embodiments of the disclosure. The following embodiments are used to illustrate this application, but not to limit the scope of the disclosure.

"Some embodiments" involved in the following descriptions describes a subset of all possible embodiments. However, it can be understood that "some embodiments" may be the same subset or different subsets of all the possible embodiments, and may be combined without conflicts.

Figure 1B:
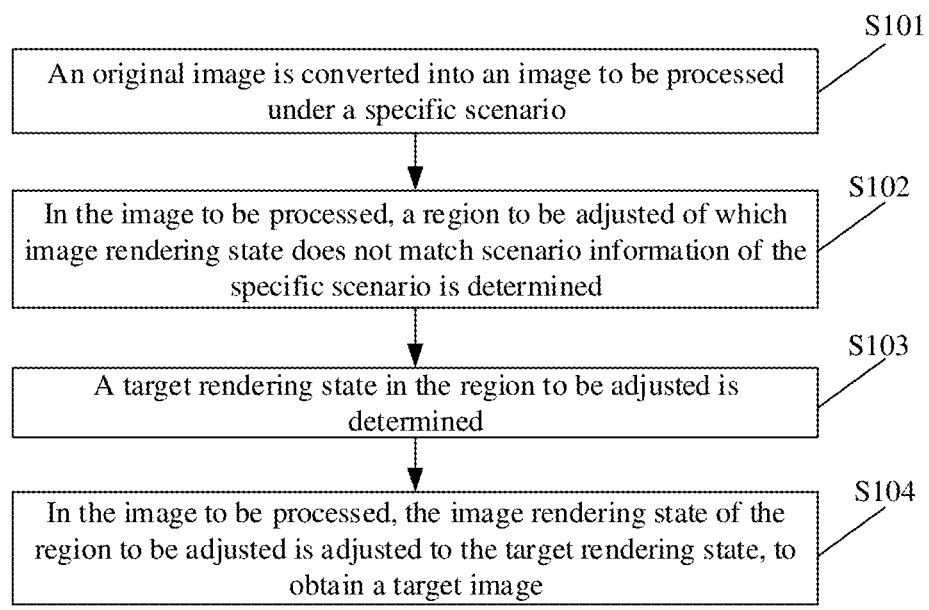
FIG. 1B is a schematic implementation flowchart of an image generation method according to an embodiment of the disclosure.

FIG. 1B is a schematic implementation flowchart of an image generation method according to an embodiment of the disclosure. As shown in FIG. 1B, description is performed with reference to operations shown in FIG. 1B.

At S101, the original image is converted into an image to be processed under a specific scenario.

In some embodiments, the original image may be an image acquired under any scenario, may be an image including complex picture content, or may be an image including simple picture content, for example, a road image acquired late at night, or a road image acquired at the daytime. The specific scenario includes a daytime scenario, an evening scenario, a rain/snow scenario, or a sunny scenario. The scenario information of the specific scenario includes a scenario where the image to be processed is acquired, for example, the light and shade degree of light in the scenario, a position where the scenario is located, and an object in the scenario. For example, the image to be processed is a road image under a late night scenario. Then the scenario information includes the light and shade degree of the road, a position of the road, and objects on the road, such as vehicles and street lamps.

In some possible implementations, the image to be processed may be the image under the specific scenario, for example, the late night scenario, the evening scenario, or an early morning scenario.

S101 of converting the original image into the image to be processed under the specific scenario may be implemented by means of the following operations.

A process of acquiring a target object, and performing style conversion on the original image according to the specific scenario, to obtain the image to be processed includes the following operations.

At a first operation, the original image is acquired.

In some possible implementations, the original image is an image acquired under any scenario, for example, a road image acquired at the daytime or a road image acquired at night.

At a second operation, the scenario information of the original image is determined.

In some possible implementations, after the original image is acquired, and by using a trained discriminator, whether the scenario information of the image is the specific scenario is determined. For example, if the specific scenario is the night scenario without a light source, whether the scenario information of the image is the night scenario without a light source is determined by using a discriminator.

At a third operation, when the scenario information does not match the specific scenario, style conversion is performed on the original image, to obtain the image to be processed under the specific scenario.

In some possible implementations, when the scenario information of the original image is obviously far from the specific scenario, the scenario information of the original image is converted into the scenario information of the specific scenario. That is to say, the original image is converted into the image under the specific scenario, so as to obtain the image to be processed under the specific scenario. For example, if the specific scenario is the night scenario without a light source and the original image is an image acquired under the daytime scenario with sunshine, the original image acquired under the daytime scenario with sunshine is converted into an image of the night scenario without a light source, so that the corresponding image to be processed of the night scenario without a light source may be generated by inputting the original image into a generator. For example, if the specific scenario is the daytime scenario with sunshine and the original image is an image acquired under the night scenario without a light source, the original image acquired under the night scenario without a light source is converted into an image of the daytime scenario with sunshine, so that the corresponding image to be processed of the daytime scenario with sunshine may be generated by inputting the original image into the generator.

In some embodiments, when the scenario information matches the specific scenario, the original image is determined as the image to be processed.

For example, when the scenario information indicates a scenario same or very similar to the specific scenario, it indicates that the original image includes the specific scenario, so that the original image may be used as the image to be processed without performing image conversion on the original image. In a specific example, if the specific scenario is a late night scenario without a light source, the original image is an image acquired under a nightfall scenario. The scenario and the specific scenario are similar, which both are at night, and then the original image is determined as the image to be processed.

By means of the first operation to the third operation, after the original image is acquired, the scenario information of the original image is determined. When the scenario information does not indicate the specific scenario, style conversion is performed on the original image, so that the image to be processed including the specific scenario is obtained.

At S102, in the image to be processed, a region to be adjusted of which image rendering state does not match scenario information of the specific scenario is determined.

In some embodiments, the image rendering state of the region to be adjusted is related to light illuminated on a target object in the original image. The target object includes a vehicle. In some possible implementations, the target object may be an object that can generate a shadow under the illumination of the light, or may be any vehicles, traffic signs, pedestrians or animals included in the picture content of the image to be processed. For example, if the image to be processed is an urban road image at night, and the image includes buildings, pavements, vehicles parked beside the roadsides, and the like, the target object that can generate a shadow under the illumination of the light is the buildings and the vehicles.

The image rendering state is a rendering state of the target object with or without a light source, which includes at least a shadow state and a shadow-free state. The light source includes an artificial light source and a natural light source. The artificial light source includes light sources such as street lamps, building lamps, and car lights. The image rendering state not matching the scenario information is that, for the scenario information, the image rendering state of an object in the image does not match an actual scenario. For example, under a night scenario, if there is no light source (that is, there are no artificial light source and moon light), the object does not generate shadows, so that the shadow rendering state not matching the night scenario without a light source is the shadow state. Under the daytime scenario with sunshine, the object generates shadows, so that the shadow rendering state not matching the daytime scenario with sunshine is the shadow-free state.

In some possible implementations, by segmenting the image to be processed into shadow regions and shadow-free regions, whether the shadow rendering states of the shadow regions and the shadow-free regions match the scenario information is determined. For example, if the scenario information indicates the night scenario without a light source, the shadow rendering state not matching the scenario is the shadow state. After the image to be processed are segmented into the shadow regions and the shadow-free regions, the shadow region in the image to be processed of which shadow rendering state is the shadow state is determined as the region to be adjusted.

At S103, a target rendering state in the region to be adjusted is determined.

In some embodiments, the target rendering state matching the scenario information is a state that the target object in the scenario information actually generates shadows. If the scenario information indicates the night scenario without a light source, the shadow-free state is determined as the target rendering state matching the scenario information. If the scenario information indicates the daytime scenario with sunshine or the night scenario with a light source, the shadow state is determined as the target rendering state matching the scenario information. In this way, the determined target rendering state can perfectly match the scenario information, which is in line with an actual scenario. For example, under the night scenario without a light source, the object does not generate a shadow, so that the target rendering state matching the night scenario without a light source is the shadow-free state. Under the daytime scenario with sunshine, due to the illumination of sunshine, the target object generates the shadow, so that the target rendering state matching the daytime scenario with sunshine is the shadow state.

In a specific example, for example, the scenario information indicates the night scenario without a light source, the target rendering state matching the scenario information is the shadow-free state, and the image to be processed is a road image. If the image includes a vehicle parked beside the roadside and a tree, by performing shadow region segmentation on the image to be processed, if a vehicle shadow is generated around the vehicle, an image region occupied by the shadow is the region to be adjusted. A region in the image of which shadow rendering state is the shadow-free state is a region having the target rendering state.

In another example, if the scenario information indicates a night scenario with a light source, for example, there is the artificial light source such as a street lamp, the target rendering state matching the scenario information is the shadow state. By using the image to be processed being the road image as an example, if the image includes the vehicle parked beside the roadside and the tree, by performing shadow region segmentation on the image to be processed, if the vehicle shadow is not generated around the vehicle, the image region occupied around the vehicle is the region to be adjusted. The region in the image of which shadow rendering state is the shadow state is the region having the target rendering state.

In some embodiments, if the specific scenario is a rainy scenario, the region to be adjusted not matching the scenario is an image region not including raindrops. If the specific scenario is a snowy scenario, the region to be adjusted not matching the scenario is an image region not including snowflakes.

In an example, by using the scenario information indicating a rain/snow scenario as an example, if the original image is an image acquired without rain/snow, the region to be adjusted is an uncover region (that is, an open-air region) in the original image, and then raindrops/snowflakes are added in the region to be adjusted to obtain the target image in line with the rain/snow scenario.

Alternatively, by using the scenario information indicating a scenario without rain/snow as an example, if the original image is an image acquired in rain/snow weather, the region to be adjusted is a region where raindrops/snowflakes appear in the original image, and then the raindrops/snowflakes are removed from the region to be adjusted to obtain the target image in line with the scenario information. Therefore, for the image under the rain/snow scenario, the raindrops/snowflakes are added or removed from the original image according to the scenario information of the specific scenario, so that the more realistic target image can be obtained.

In other embodiments, if the scenario information indicates the rain/snow scenario at night, and the original image is an image acquired during the day without rain/snow, the original image may be first converted into an image of the night scenario, and the shadow region in the converted image is adjusted. Then, the raindrops/snowflakes are added in the obtained image, to obtain the target image.

At S104, in the image to be processed, the image rendering state of the region to be adjusted is adjusted to the target rendering state, to obtain a target image.

In some embodiments, in the image to be processed, by means of the conversion of the image rendering state of the region to be adjusted, the region to be adjusted has the target rendering state matching the scenario information, so as to obtain the target image. In some possible implementations, in the image to be processed, the image rendering state of the region to be adjusted may be adjusted to be the target rendering state, to obtain the target image. The image region having the target rendering state may also be generated according to the target rendering state and the picture content of the region to be adjusted. The region to be adjusted in the image to be processed is replaced with the image region, so as to obtain the target image.

For example, the scenario information indicates the night scenario without a light source. If the target rendering state is the shadow state, the shadow rendering state of the region to be adjusted is the shadow-free state. In the image to be processed, the shadow-free state of the region to be adjusted may be adjusted to be the target rendering state, to obtain the target image. The image region having the shadow-free state may also be generated according to the shadow-free state and the picture content of the region to be adjusted. The region to be adjusted in the image to be processed is replaced with the image region, and the replaced image is smoothed, so as to obtain the target image. Therefore, the shadow rendering state in the generated target image is the shadow-free state, which matches the night scenario without a light source, so that the generated target image can be more realistic.

In this embodiment of the disclosure, by means of, in the image to be processed, determining the region to be adjusted of which image rendering state does not match the scenario information, then adjusting the shadow rendering state of the region to be adjusted to the target rendering state matching the scenario information, to generate the target image of which shadow rendering state matches the scenario information, the generated target image can be more vivid and realistic.

In some embodiments, a process of determining the region to be adjusted in S102 may be implemented by means of an image segmentation network. The neural network may be any network configured for image segmentation. An implementation process includes the following.

The neural network is used to label the region to be adjusted and the reference region by means of a bounding box, so that the region to be adjusted and the reference region can be accurately predicted in the image to be processed. That is to say, by means of the image segmentation network, the region to be adjusted and the reference region in the image to be processed may be labeled by using the bounding box, so as to label the region to be adjusted and the reference region.

In some possible implementations, the image segmentation network may be any type of neural networks, such as a fully convolutional neural network, an atrous convolutional network, an analysis network, or the like. By inputting the image to be processed into the trained image segmentation network, and using, in the image segmentation network, a rectangular box to label positions of the region to be adjusted and the reference region in the image to be processed, the region to be adjusted and the reference region are labeled.

In some embodiments, a training process of the image segmentation network may be implemented by the following operations.

At a first operation, a training image is inputted into the image segmentation network to be trained, and position information of the region to be adjusted in the image to be trained of which shadow rendering state does not match the scenario information is predicted.

In some possible implementations, the image segmentation network to be trained is configured to detect the region to be adjusted in the image to be trained, and is trained by means of a large number of training images. That is to say, the large number of training images are inputted into the image segmentation network to be trained, to preliminarily predict the position of the region to be adjusted in the image to be trained.

At a second operation, a prediction loss of the position information is determined according to real position information of the region to be adjusted in the training image.

In some possible implementations, by using a difference between the labeled real position information of the region to be adjusted in the training image and the position information for predicting the region to be adjusted, the prediction loss is determined. By means of the real position information of a plurality of regions to be adjusted, the accuracy of a plurality of pieces of the position information predicted by the image segmentation network to be trained is determined, so that the prediction loss can be determined.

At a third operation, according to the prediction loss, a network parameter of the image segmentation network to be trained is adjusted to obtain the image segmentation network.

In some possible implementations, the accuracy of each predicted position information is determined by combining the real position information of the region to be adjusted. The accuracy is fed back to the image segmentation network, to cause the image segmentation network to adjust the network parameter such as a weight parameter, so that the accuracy of neural network detection can be enhanced. For example, the position information of 100 regions to be adjusted is obtained. The neural network is first used for operations such as convolution and deconvolution, to obtain confidence of the position information of the 100 regions to be adjusted. Since the parameters of the image segmentation network at a training phase are randomly initialized, roughly estimated confidence of the position information of the 100 regions to be adjusted is also random. Then, if the accuracy of the position information predicted by the image segmentation network is required to be enhanced, it is necessary to let the neural network know which of the 100 pieces of position information is right and which is wrong. Based on this, the 100 pieces of position information are compared with the real position information by using a comparison function. If the similarity of the position information and the real position information is greater than a preset similarity threshold, 1 is outputted, otherwise is outputted. In this way, 200 comparison values (0, 1) are outputted by the comparison function. Next, the 200 comparison values are inputted into the image segmentation network to be trained, to cause the image segmentation network to be trained to supervise the position information by using a loss function, so that the confidence of the position information is increased for the position information with the comparison value being 1, and the confidence of the position information is decreased for the position information with the comparison value being 0. Therefore, the confidence of each piece of position information is obtained, that is, a detection result of the position information is obtained. Finally, the weight parameter of the image segmentation network is adjusted by using the prediction loss corresponding to the position information, so that the trained image segmentation network is obtained. For example, the weight parameter is a neuron weight in the neural network. The prediction loss is a cross entropy loss of a positive sample and a negative sample. By using the prediction loss to adjust the parameter of the neural network such as weight, a prediction result of the adjusted image segmentation network can be more accurate.

The above process is a process of training the image segmentation network. A plurality of iterations are performed based on a predicted position of the region to be adjusted and a position of a real region to be adjusted that are obtained by predicting the inputted image to be processed, to cause the prediction loss of the position information outputted by the trained image segmentation network to meet a convergence condition, so that the accuracy of the region to be adjusted detected by the neural network can be higher.

In some embodiments, if the image rendering state includes the shadow rendering state, the target rendering state that is required to be switched for the region to be adjusted may be determined by means of the following two manners. That is to say, S103 may be implemented by means of the following two manners.

Manner I: at S111, in the image to be processed, a reference region of which shadow rendering state matches the scenario information is determined.

In some embodiments, the shadow rendering state includes a shadow state and a shadow-free state. If the shadow rendering state of the region to be adjusted does not match the scenario information, the shadow rendering state of the reference region that is different from the shadow rendering state of the region to be adjusted matches the scenario information. For example, if the scenario information indicates the night scenario without a light source, and the region to be adjusted is at the night scenario without a light source, the target object in the image generates a shadow region. Based on this, the reference region is a shadow-free image region in the image.

In some possible implementations, if the scenario information indicates the night scenario without a light source, in the image to be processed, the shadow-free region of which shadow rendering state is the shadow-free state is used as the reference region. In this way, under the night scenario without a light source, due to dim light, the target object in a rational night scenario does not generate shadows. Therefore, by using the shadow-free region as the reference region, the region to be adjusted can be more in line with the natural law after being adjusted according to the reference region.

At S112, the shadow rendering state of the reference region is determined as the target rendering state.

In some embodiments, after the reference region is determined in the image to be processed, the shadow rendering state of the reference region is used as the target rendering state that is required to be switched for the region to be adjusted.

In some possible implementations, if the scenario information indicates the night scenario without a light source or a daytime scenario without sunshine, in the image to be processed, the image region of which shadow rendering state is the shadow-free state is determined as the reference region. In this way, whether it is a night scenario without a light source or a daytime scenario without sunshine, an image region in a shadow-free state matching the scenario is used as the reference region, so as to perform histogram matching on the region to be adjusted based on the reference region, so that picture chroma represented by the processed region to be adjusted can be the same as picture chroma of the reference region.

If the scenario information indicates the night scenario with a light source or a daytime scenario with sunshine, in the image to be processed, the image region of which shadow rendering state is the shadow state is determined as the reference region. In this way, whether it is a night scenario with a light source or a daytime scenario with sunshine, an image region in a shadow state matching the scenario is used as the reference region, so as to perform histogram matching on the region to be adjusted based on the reference region, so that picture chroma represented by the processed region to be adjusted can be the same as picture chroma of the reference region. Therefore, the image region of which shadow rendering state matches the scenario information is used as the reference region, so as to perform histogram matching on the region to be adjusted and the reference region, so that the histogram of the region to be adjusted is consistent with the histogram of the reference region. Therefore, a picture effect of the target image can be more natural.

In manner I, by determining, in the image to be processed, the image region of which shadow rendering state matches the scenario information, the target rendering state is determined, so that the hue of the region to be adjusted after shadow adjustment is consistent with the hue of other regions.

Manner II: the shadow rendering state matching a light parameter is determined by analyzing the light parameter of the scenario information, so as to obtain the target rendering state.

In some embodiments, the light parameter includes a light intensity and a light illumination angle. If the light intensity is relatively strong (for example, the light intensity is greater than a certain threshold), the target rendering state is determined as the shadow state. If the light intensity is relatively weak (for example, the light intensity is less than the certain threshold), the target rendering state is determined as the shadow-free state. Therefore, in manner II, by analyzing the scenario information of the image to be processed to set the target rendering state, the set target rendering state can be more in line with a scenario requirement.

In some embodiments, if the scenario information indicates the night scenario without a light source or the daytime scenario without sunshine, the region where the shadow is generated is used as the region to be adjusted. That is to say, S102 may be implemented by the following processes.

In a case where the scenario information indicates a night scenario without a light source or a daytime scenario without sunshine, a shadow region in the image to be processed is determined as the region to be adjusted.

In some embodiments, under the night scenario without a light source or the daytime scenario without sunshine, the target object does not generate shadows. Therefore, in the image to be processed, if there are shadows in the target object, it indicates that the shadow region is irrational. Based on this, in the target object of the image to be processed, an object generating the shadow is used as the target object and is selected, so as to subsequently determine irrational image regions from the image to be processed. In a specific example, if the image to be processed is the road image under the night scenario without a light source, the target object that can generate the shadow under light illumination includes a vehicle. If the shadow rendering state of the shadow region generated by the vehicle is the shadow state, the shadow region generated by the vehicle is used as the region to be adjusted.

Figure 2:
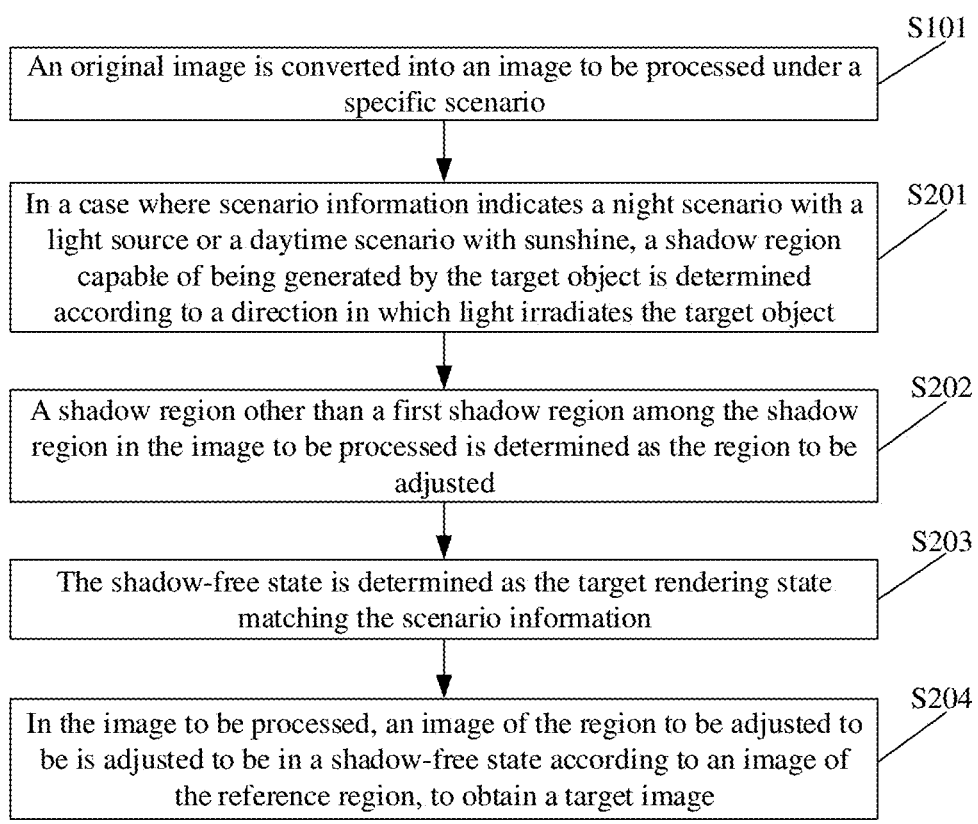
FIG. 2 is another schematic implementation flowchart of an image generation method according to an embodiment of the disclosure.

In some embodiments, FIG. 2 is another schematic implementation flowchart of an image generation method according to an embodiment of the disclosure. Details are described below with reference to FIG. 1 and FIG. 2.

At S201, in a case where scenario information indicates a night scenario with a light source or a daytime scenario with sunshine, a shadow region capable of being generated by the target object is determined according to a direction in which light irradiates the target object.

In some embodiments, under the daytime scenario with sunshine or a light source at night being moon light, the shadow region capable of being generated by the target object is generated by determining a direction in which light irradiates the target object. If a light source in the night scenario with a light source is the artificial light source, not only the direction in which light irradiates the target object needs to be determined, but also a distance between the target object and the artificial light source needs to be further determined, and then the shadow region capable of being generated by the target object is determined. An implementation process is shown as S221 and S222.

At S202, a shadow region other than a first shadow region within the shadow region in the image to be processed is determined as the region to be adjusted.

In some embodiments, the first shadow region is an intersection of the shadow region in the image to be processed and the shadow region capable of being generated by the target object.

In S201 and S202, a manner of determining the region to be adjusted in the image to be processed in a case where the scenario information indicates the night scenario with a light source or the daytime scenario with sunshine is provided. In the manner, by using the shadow region in the image to be processed other than the shadow region capable of being generated by the target object as the region to be adjusted, a region of which shadow rendering state is required to be adjusted can be determined more accurately.

In other embodiments, if the scenario information indicates the night scenario with a light source, for example, the light source is the artificial light source, the shadow region outside an illumination range of the light source is used as the region to be adjusted, and then S102 may be implemented by the following processes.

In the image to be processed, the shadow region with a distance from the light source greater than a preset distance threshold and generated by the target object of the generated shadow region is determined as the region to be adjusted.

In some embodiments, the shadow region generated by the target object that can generate the shadow region may be an image region away from a side of the light source. The distance between the artificial light source and the target object is greater than the preset distance threshold, it indicates that the target object is not within the illumination range of the artificial light source. That is to say, when the artificial light source is in an operation state, the target object cannot generate shadows, further indicating that the shadow region generated by the target object is irrational. When there is the artificial light source at night, the distance between the artificial light source and each target object is determined. First, the illumination range of the artificial light source is determined. Then, whether the target object is within the illumination range of the artificial light source is determined by determining the distance between the artificial light source and each target object. In a specific example, if the image to be processed is an urban road image under a night scenario with a street lamp, there is a street lamp in a turned-on state in the scenario, and the target object is a building and a tree. By respectively determining distances between the street lamp and the building and the tree, whether the building and the tree are within an illumination range of the street lamp is determined, that is, whether the building and the tree can generate shadows under the illumination of the street lamp. When the target object is not within the illumination range of the street lamp, the shadow region generated by the target object is the region to be adjusted.

A manner of determining the region to be adjusted in the image to be processed in a case where the scenario information indicates the night scenario with an artificial light source is provided. In the manner, in a case where the scenario information indicates the night scenario with an artificial light source, whether the target object in the image outside the illumination range of the light generates the shadow region is determined, and then the irrational shadow region is used as the region to be adjusted.

After the image region of which shadow rendering state is the shadow state is determined as the region to be adjusted by means of S201 and S202, S103 and S104 may be respectively implemented by means of S203 and S204. The target image is obtained by processing the region to be adjusted.

At S203, the shadow-free state is determined as the target rendering state matching the scenario information.

In some embodiments, if the scenario information indicates the night scenario without a light source or the daytime scenario without sunshine, the target object does not generate shadows. Therefore, in the image to be processed, if there is no shadow, it indicates that the image is rational, which matches the scenario information. Based on this, in the image to be processed, the shadow-free region may be used as the reference region. That is to say, the target rendering state matching the scenario information is the shadow-free state.

At S204, in the image to be processed, an image of the region to be adjusted to be is adjusted to be in a shadow-free state according to an image of the reference region, to obtain a target image.

In some embodiments, in the image to be processed, by means of adjusting the shadow state of the region to be adjusted, shadows of the region are removed, so as to obtain the target image. In some possible implementations, the histogram of the reference region in the shadow-free state may be matched with the histogram of the region to be adjusted, to remove the shadows of the region to be adjusted, so that consistent grayscale of the shadow-free image regions in the target image is achieved. The shadows in the region to be adjusted may also be removed in other manners. For example, maximum filtering is first performed on grayscale images of the region to be adjusted, and then minimum filtering is performed. If the image background of the region to be adjusted is relatively dim and the target object is relatively bright, minimum filtering may first be performed on the region to be adjusted, and maximum filtering is then performed, to remove the shadows in the region to be adjusted. Alternatively, a shadow-free image of which picture content matching that of the region to be adjusted may be selected from the preset image library to directly replace the region to be adjusted. Alternatively, the shadows of the region to be adjusted may be removed by decomposing the shadow images.

In this embodiment of the disclosure, in the image to be processed, the region occupied by the region to be adjusted in the image to be processed is determined, and the image of the region to be adjusted is adjusted from the shadow state to the shadow-free state according to the image of the reference region, so that the target image is obtained. Alternatively, in the image to be processed, by performing shadow removing on the region to be adjusted, the target image can be obtained without using other regions to replace the region to be adjusted. Therefore, the shadow rendering state in the generated target image is the shadow-free state, which is more suitable for the night scenario without a light source or the daytime scenario without sunshine.

In some possible implementations, the grayscale of the region to be adjusted is adjusted according to the grayscale of the reference region, to generate the target image. That is to say, S204 may be implemented by the following operations.

At S241, the grayscale image of the region to be adjusted is adjusted according to the image of the reference region, to obtain an adjusted grayscale map.

In some embodiments, a grayscale image of the reference region is first determined. The reference region may be determined from the image to be processed. That is to say, the image region having the shadow rendering state matching the scenario in the image to be processed is used as the reference region. Alternatively, the reference region may be the image region that is generated based on the target rendering state and the picture content of the image of the region to be adjusted after the target rendering state is set.

In some possible implementations, the grayscale image of the reference region is obtained by determining the histogram of the reference region. For example, after the reference region is determined, the histogram of the reference region is generated according to the image of the reference region, and then the grayscale image of the reference region may be generated based on the histogram. In a specific example, for example, if the scenario information indicates the night scenario without a light source, the target rendering state is the shadow-free state. In the image to be processed, without the artificial light source, a region with shadows in the image region acts as the region to be adjusted, and a region without a shadow in the image region acts as the reference region. The grayscale image of the region is generated by determining the histogram of the shadow-free region.

Then, based on the grayscale image of the reference region, the grayscale image of the region to be adjusted is adjusted to obtain the adjusted grayscale map. The grayscale image of the region to be adjusted may be obtained by determining the histogram of the region to be adjusted. For example, after the region to be adjusted is determined, the histogram of the region to be adjusted is generated according to the image of the region to be adjusted, and then the grayscale image of the region to be adjusted may be generated based on the histogram. The grayscale image of the region to be adjusted is adjusted by using the grayscale image of the reference region as a reference, to cause the obtained adjusted grayscale map to match the grayscale image of the reference region, that is, to cause the hue of colored images corresponding to two grayscale images to be consistent.

In some possible implementations, the adjustment of the grayscale image of the region to be adjusted may be implemented by the following processes.

First, the histogram of the reference region is generated according to the image of the reference region, to adjust the histogram of the region to be adjusted based on the histogram of the reference region, so as to obtain the adjusted histogram. For example, histogram matching is performed on the histogram of the region to be adjusted and the histogram of the reference region, to obtain the adjusted histogram. By using the histogram of the reference region as a target histogram, the histogram of the region to be adjusted is converted into the target histogram, to cause the histogram of the reference region to match the histogram of the region to be adjusted. That is to say, the histogram of the region to be adjusted is matched to the histogram of the reference region, so that the hue of the two regions remains consistent. In this way, the shadow rendering state of the region to be adjusted and the shadow rendering state of the reference region remain consistent, which can both match the scenario information and both are rational shadow states under the scenario.

Then, the adjusted grayscale map is determined based on the adjusted histogram. For example, based on the adjusted histogram, a grayscale image of the adjusted histogram may be generated, that is, the adjusted grayscale map is obtained.

In some possible implementations, under the night scenario without a light source, the reference region is the shadow-free region in the image to be processed. By means of determining a histogram of the shadow-free region, and converting the histogram of the region to be adjusted into the histogram of the shadow-free region, the shadows of the region to be adjusted may be removed, so that the adjusted histogram is obtained.

At S242, based on the adjusted grayscale map, an image of a replacement region of which shadow rendering state is the shadow-free state is generated.

In some embodiments, after the grayscale image of the adjusted histogram is generated by means of the adjusted histogram, in combination with the picture content of the region to be adjusted, the grayscale image is rendered to generate the image of the replacement region in the shadow-free state.

At S243, in the image to be processed, the image of the region to be adjusted is replaced with a generated image of the replacement region, to generate the target image.

In some embodiments, in the image to be processed, by means of determining the image of the replacement region of which shadow rendering state does not match the scenario information, determining the region occupied by the region to be adjusted in the image to be processed, using the image of the replacement region to replace the image of the region to be adjusted, and smoothing the replaced image, the target image can be generated.

In a specific example, by using the scenario information indicating the night scenario without a light source as an example, the image to be processed is a road image, and the region to be adjusted of which shadow rendering state does not match the scenario information is the shadow region. The image of the replacement region is an image of which shadow rendering state is the shadow-free state, and such the shadow-free image region is used to replace the image of the region to be adjusted, to obtain the target image of which shadow rendering state matches the scenario information. Therefore, the shadow rendering state in the generated target image matches the scenario information, so that the generated target image can be more realistic.

In some possible implementations, after the region to be adjusted is replaced with the replacement region, the replaced image is further smoothed to generate the target image. That is to say, S243 may be implemented by the following operations.

At a first operation, a shape and size of the image of the replacement region are adjusted to be consistent with that of the image of the region to be adjusted, to obtain an image of the adjusted replacement region.

In some possible implementations, the size information of the image of the replacement region is first determined. After the replacement region is determined, the size information of the replacement region is required to be determined, which includes at least an area, a perimeter, a length, a width, an edge shape, and the like. Then, an area occupied by the image of the region to be adjusted in the image to be processed is determined. In some possible implementations, by using the image segmentation network to label the region to be adjusted by using a bounding box, the area of the bounding box may be used as the area of the region occupied by the region to be adjusted in the image to be processed. Finally, according to the area, the size information of the image of the replacement region is adjusted, to obtain the image of the adjusted replacement region. In some possible implementations, according to the area of the region occupied by the region to be adjusted in the image to be processed, the size information of the image of the replacement region is adjusted, to cause the size information of the image of the adjusted replacement region to match the size of the image of the region to be adjusted.

At a second operation, the image of the adjusted replacement region is used to replace the image of the region to be adjusted in the image to be processed, and an edge of the image of the adjusted replacement region is smoothed to generate the target image.

In some possible implementations, the image of the adjusted replacement region is first used to replace the image of the region to be adjusted, to generate a candidate image. That is to say, in the image to be processed, the adjusted replacement region is used to replace the region to be adjusted, so that a replaced image is obtained, that is, the candidate image. In a specific example, if the scenario information indicates the night scenario without a light source, the image to be processed is the road image, and the region to be adjusted is the shadow region of which shadow rendering state does not match the night scenario without a light source. For example, without a light source, there is a tree shadow in the image, it indicates that the display mode of the image region occupied by the tree shadow is irrational. Then, the adjusted replacement region includes trees without shadows. The image of the adjusted replacement region may be obtained by adjusting the size of the image of the replacement region. Therefore, the image of the region to be adjusted is replaced with the image of the adjusted replacement region, to generate the target image. Then, the candidate image is smoothed to generate the target image. In some possible implementations, a region where a replacement operation occurs in the candidate image may be smoothed to eliminate noise of the image in the region, or the whole candidate image may be smoothed to reduce the noise of the whole image, so as to obtain the target image. Therefore, the target image can be obtained.

In this embodiment of the disclosure, by means of adjusting the size of the image of the replacement region, using the image of the adjusted replacement region after size adjustment to replace the image of the region to be adjusted, and smoothing the replaced image, the generated target image can be more rational and clear.

In some embodiments, if the scenario information indicates the night scenario with a light source, for example, the light source is the artificial light source, the shadow region capable of being generated by the target object within the illumination range of the light source is used as the region to be adjusted, and the above may be implemented by the following operations.

At S221, in a case where the scenario information indicates the night scenario with a light source or the daytime scenario with sunshine, the shadow region capable of being generated by the target object is determined according to a direction in which light irradiates the target object.

In some embodiments, by analyzing the direction in which light irradiates the target object, the shadow region capable of being generated by the target object is determined in the image to be processed. Under the night scenario with a light source or the daytime scenario with sunshine, the shadow rendering state matching an actual scenario is that the target object has shadows.

At S222, the shadow region capable of being generated by the target object is determined as the region to be adjusted.

In some embodiments, target objects closer to the artificial light source may be first determined from the target objects included in the image to be processed. Then, target objects where the shadow region is not generated are determined from these target objects closer to each other. Since the target object is closer to the artificial light source, it indicates that the target object is within the illumination range of the artificial light source. Then under the night scenario with an artificial light, the target object within the illumination range of the artificial light source can generate shadows. Since the target object does not generate the shadow region, such a case is irrational. Therefore, the shadow region capable of being generated by the target object not generating the shadow region is required to be used as the region to be adjusted.

In some embodiments, the shadow region capable of being generated by the target object not generating the shadow region may be determined based on the image region occupied by the target object and an illumination direction of the artificial light source. That is to say, based on the image region occupied by the target object, by analyzing the illumination direction of the artificial light source, a shadow area and shadow position generated by the target object under the illumination of the artificial light source can be estimated. Then, the image region corresponding to the shadow area and shadow position is determined as the shadow region capable of being generated by the target object.

Under the night scenario with the artificial light source, the shadow region capable of being generated by the target object within the illumination range of the light source is used as the region to be adjusted that is required to be adjusted. Alternatively, under the night scenario with moon light or the daytime scenario with sunshine, the shadow region capable of being generated by the target object is determined as the region to be adjusted.

In a possible implementation, since a relative position of the light source and the target object may be changed, for example, the original image is an image acquired on a sunny morning, and a current moment is at afternoon, it is apparent that the relative position of the illumination direction of sunshine and the target object is changed. In this case, the shadow region capable of being generated by the target object is required to be re-determined according to the illumination direction of the light source at the current moment, so that the region to be adjusted can be determined. Then, by means of determining a light parameter of the light source at the current moment, and rendering the region to be adjusted according to the light intensity of the light source illuminated on the surface of the target object, the target image can be obtained. Therefore, the finally adjusted target image can be more real and natural.

In some embodiments, there may be a plurality of regions to be adjusted in the image to be processed. For example, if the scenario information indicates the night scenario with the artificial light source, the target object closer to the artificial light source exists in the image to be processed, or an artificial object far from the artificial light source also exists. Then, in the image to be processed, the shadow region capable of being generated by the target object within the illumination range of the artificial light source and the shadow region outside the illumination range of the light source are both used as the region to be adjusted that is required to be adjusted.

In some embodiments, if the scenario information indicates the night scenario with a light source, for example, the light source is the moon light, the region to be adjusted may be determined by means of the following manners.

At S231, in the image to be processed, if the scenario information indicates the night scenario with the moon light, the target object that can be illuminated by the moon light is determined.

At S232, in the target object that can be illuminated by the moon light, the shadow region capable of being generated by the target object not generating the shadow region is determined as the region to be adjusted.

In some embodiments, if the scenario information indicates the daytime scenario with sunshine, the region to be adjusted may be determined by means of the following manners.

At S241, in the image to be processed, if the scenario information indicates the daytime scenario with sunshine, the target object that can be illuminated by sunshine is determined.

At S242, in the target object that can be illuminated by sunshine, the shadow region capable of being generated by the target object not generating shadows is determined as the region to be adjusted.

In some embodiments, after the region to be adjusted is determined, the region to be adjusted is adjusted by means of the following processes, to obtain the target image.

At a first operation, a light parameter in the specific scenario is determined.

In some embodiments, under the night scenario with the artificial light source, the artificial light source is determined to be in an operation state, that is, in a turned-on state. The light parameter includes a light intensity, a light illumination direction, and light brightness. Under the night scenario with the moon light or the daytime scenario with sunshine, the light parameter that the moon light or sunshine illuminates the ground at the current moment is determined.

At a second operation, based on the light parameter, a light intensity of a surface of the target object that can generate the shadow region is determined, and the region to be adjusted is rendered to obtain the target image.

In a specific example, under the night scenario with the artificial light source, the image to be processed includes a vehicle and a street lamp. The artificial light source is the street lamp. By analyzing the light intensity and the light illumination direction of the street lamp, a shadow region capable of being generated by the vehicle in the image to be processed is determined. The shadow region capable of being generated by the vehicle in the image to be processed is rendered according to the light intensity on the surface of the vehicle, so as to obtain the image of the replacement region. Therefore, the image of the region to be adjusted is replaced with the obtained image of the replacement region, to generate the target image.

In this embodiment of the disclosure, under the night scenario with the artificial light source and the target object is within the illumination range of the artificial light source, or under the night scenario with the moon light or the daytime scenario with sunshine, in the image to be processed, the shadow region capable of being generated by the target object is rendered according to the light parameter. Therefore, a target object in the target image that is closer to an artificial light source can generate the shadow region. In addition, the target object can generate the shadow region under natural light, so that the fidelity of the generated target image can be improved.

An exemplary application of this embodiment of the disclosure in an actual application scenario is described below. For example, the image acquired under the daytime scenario with sunshine is converted to be in the night scenario without a light source, the target rendering state matching the scenario information is the shadow-free state, and the region to be adjusted is the shadow region.

An embodiment of the disclosure provides a method for removing shadows under a night scenario without a light source of an image generation and histogram matching method. By means of performing processes such as shadow region segmentation, histogram matching and image generation on the daytime scenario image, the problem that an irrational shadow region is resulted when the image under the daytime scenario with sunshine is directly converted to be in the night scenario without a light source can be resolved. According to the embodiments of the disclosure, shadows in the generated image can be effectively removed, so that the generated night scenario image can be more real.

Figure 3A:
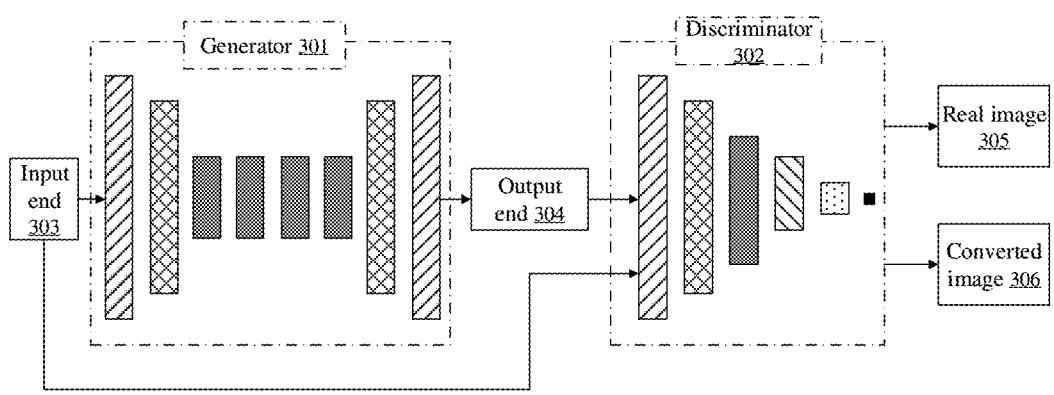
FIG. 3A is a schematic diagram of a composition structure of an image generation system according to an embodiment of the disclosure.

FIG. 3A is a schematic diagram of a composition structure of an image generation system according to an embodiment of the disclosure. The following description is performed with reference to FIG. 3A.

The image generation system provided in this embodiment of the disclosure includes a generator 301 and a discriminator 302. First, an original image under a daytime scenario with sunshine is used as an input, and is inputted into the generator 301 from an input end 303.

Figure 3B:
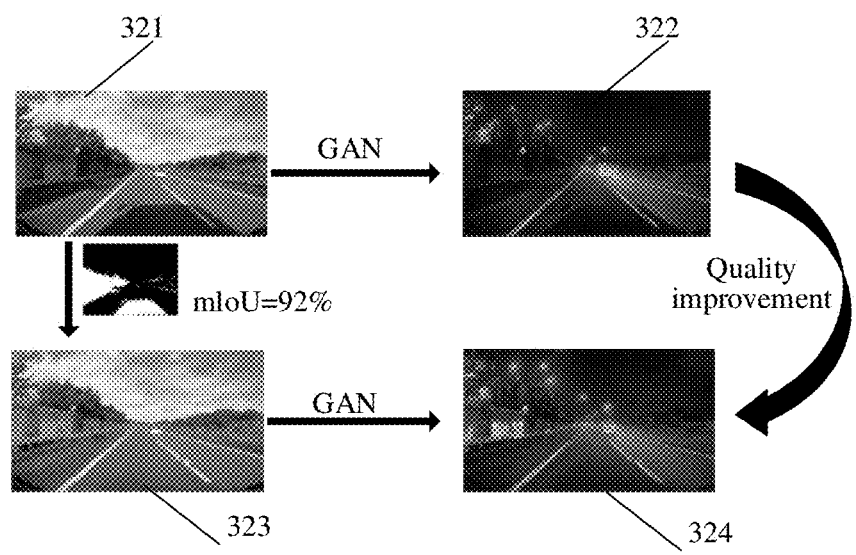
FIG. 3B is a schematic diagram of an application scenario of an image generation method according to an embodiment of the disclosure.

Next, the generator 301 is used to generate a night scenario image (corresponding to the image to be processed in the above embodiment, for example, the image 322 in FIG. 3B), and the generated night scenario image is outputted to the discriminator 302 by means of an output end 304.

In some embodiments, the image 321 in FIG. 3B is the original image, and the image 322 is a night image that the image 321 is converted from the daytime scenario with sunshine to the night scenario without a light source. By means of segmenting the image 321 into a shadow region and a shadow-free region, and performing histogram matching on the shadow region and the shadow-free region, a shadow-removed image 323 is obtained. Finally, a GAN network is used to convert the daytime scenario with sunshine of the shadow-removed image 323 into the night scenario without a light source, so as to obtain the night image 324. It may be seen from FIG. 3B that, compared with the image 322, the night image 324 has no shadows, which is more in line with the night scenario without a light source, and an image picture is more realistic.

In some possible implementations, the night scenario image acquired under the night scenario without a light source and the generated night scenario image are both inputted into the discriminator 302.

Then, the discriminator 302 is used to distinguish whether the night scenario image is the acquired night scenario image or the generated night scenario image. That is to say, a real image 305 and a converted image 306 are separately obtained.

Finally, by continuously optimizing the loss functions of the generator and the discriminator, the night scenario generated by the generator can be more real.

Figure 4:
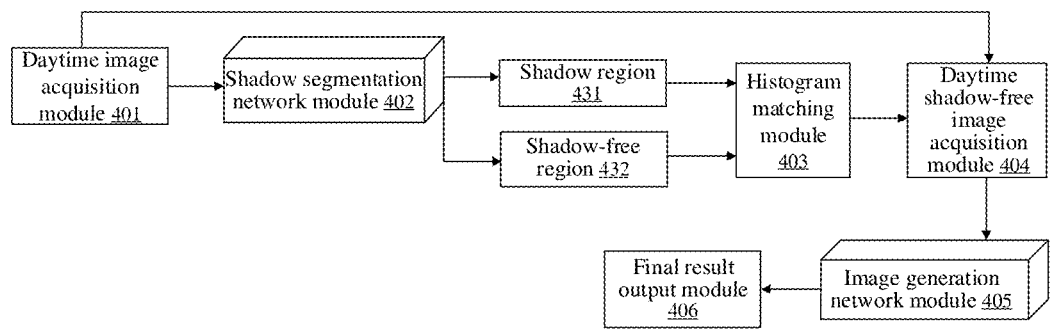
FIG. 4 is a structural diagram of an implementation framework of an image generation method according to an embodiment of the disclosure.

In some embodiments, after a daytime image of the daytime scenario with sunshine is obtained, and before the daytime image is converted into the night image, a shadow removing operation is first performed on the daytime image. Then, scenario conversion is performed on the shadow-removed image, so that a more real night image can be obtained. As shown in FIG. 4, FIG. 4 is a structural diagram of an implementation framework of an image generation method according to an embodiment of the disclosure. The following description is performed with reference to FIG. 4.

A daytime image acquisition module 401 is configured to acquire the image of the daytime scenario with sunshine, to obtain the daytime image.

A shadow segmentation network module 402 is configured to divide the daytime image into a shadow region 431 and a shadow-free region 432.

In some embodiments, the shadow region is obtained from the daytime image by means of an image segmentation network, to obtain the shadow region and the shadow-free region. In this embodiment of the disclosure, a network (a specific network structure is not limited herein, for example, a fully convolutional network, a semantic segmentation network, a Visual Geometry Group (VGG) network, a refine network (RefineNet), and the like) for image segmentation is trained by means of optimization and models, so that an image shadow extraction network that can accurately identify an image shadow region can be obtained. The segmentation of the daytime image into the shadow region and the shadow-free region is performed by using the image shadow extraction network. Therefore, the shadow region and the shadow-free region in the daytime image can be obtained simultaneously.

A histogram matching module 403 is configured to match histograms of the shadow region 431 and the shadow-free region 432 by means of a histogram matching method.

In some embodiments, by means of the histogram matching method, the shadow region obtains histogram distribution consistent with that of the shadow-free region, so that the hues of the shadow region and the shadow-free region are consistent. Since there is a large difference in the histogram distribution of the shadow region and the shadow-free region, according to a method for performing histogram matching on the shadow region and the shadow-free region in this embodiment of the disclosure, the histogram of the shadow region is converted into a target histogram (shadow-free region). In this way, the image of the shadow region is converted into the image of the shadow-free region.

A daytime shadow-free image acquisition module 404 is configured to remove shadows in the daytime image by means of histogram matching, to obtain a daytime shadow-free image.

In some embodiments, the converted shadow-free region is attached back to the original image. That is to say, the converted shadow-free region is attached back to the daytime image, so that a shadow-free image of the daytime scenario with sunshine can be obtained.

An image generation network module 405 is configured to convert the daytime scenario with sunshine of the daytime shadow-free image into the night scenario without a light source, to obtain a night image.

In some embodiments, the image generation network shown in FIG. 3A is used to convert the daytime scenario with sunshine of the daytime shadow-free image into the night scenario without a light source, to obtain the night image.

A final result output module 406 is configured to use a smoothing technology to smooth surrounding images of a replacement shadow region, so as to obtain a final night image.

Figure 5:
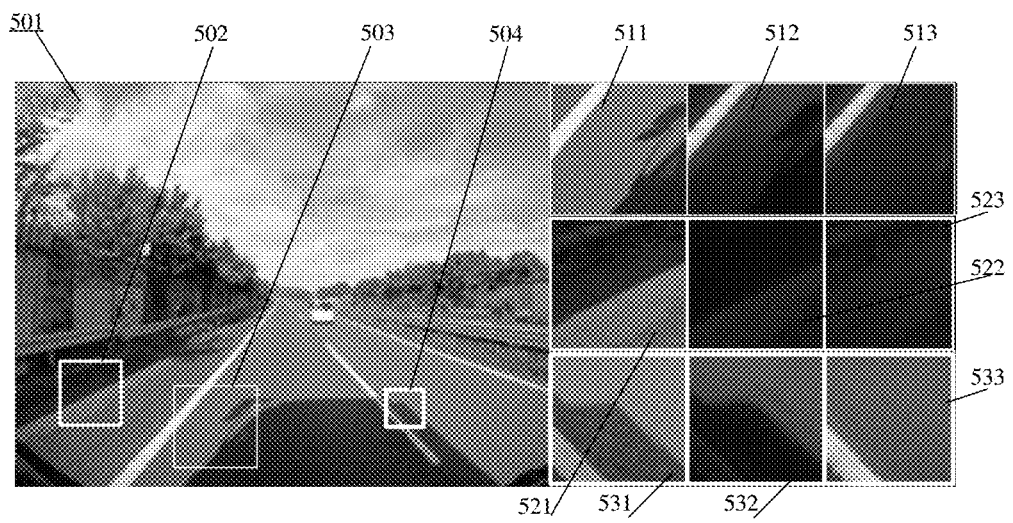
FIG. 5 is a schematic diagram of another application scenario of an image generation method according to an embodiment of the disclosure.

In some embodiments, an image after the shadow-removed region is used to replace the shadow region in the original image is shown in FIG. 5. FIG. 5 is a schematic diagram of another application scenario of an image generation method according to an embodiment of the disclosure. The original image 501 is an image acquired under the daytime scenario with sunshine. A generation process of the target image includes the following.

First, shadow detection is performed on the original image 501, and shadow regions 502, 503 and 504 are labeled by using a rectangular box.

Then, regions (that is, the shadow regions 502, 503 and 504, corresponding to the region to be adjusted in the above embodiments) labeled by the rectangular box are cutout and enlarged, to successively obtain enlarged shadow regions 511, 512 and 513, and the enlarged shadow regions are then converted into night scenario images, to successively obtain night shadow images 521, 522 and 523.

Finally, by means of histogram matching, histograms of the night shadow images 521, 522 and 523 are converted into histograms of shadow-free regions, to obtain shadow-removed images 531, 532 and 533 (corresponding to target images in the above embodiments).

In this embodiment of the disclosure, the shadow region and the shadow-free region are obtained by using the image segmentation network. Then, the shadow-removed images are obtained by means of histogram matching of the shadow region and the shadow-free region. Finally, by means of the image generation method, the image of the daytime scenario with sunshine is converted into the night scenario without a light source, so as to generate the night scenario image not including the shadow region. Therefore, shadows in the image generated at night can be effectively removed, so that the generated night scenario image can be more real and more in line with the authenticity of the night scenario.

Figure 6:
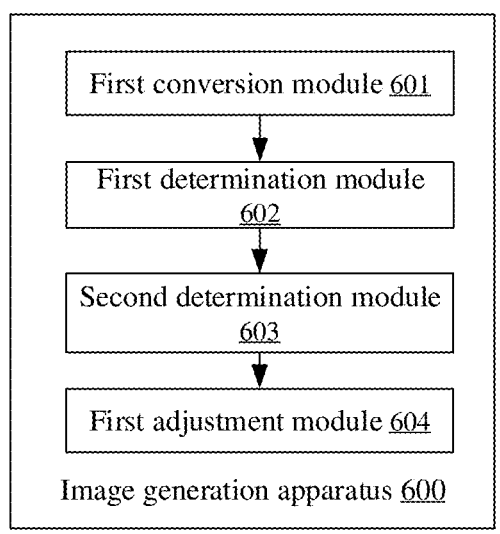
FIG. 6 is a schematic diagram of a structure composition of an image generation apparatus according to an embodiment of the disclosure.

An embodiment of the disclosure provides an image generation apparatus. FIG. 6 is a schematic diagram of a structure composition of an image generation apparatus according to an embodiment of the disclosure. As shown in FIG. 6, the apparatus 600 includes a first conversion module, a first determination module, a second determination module, and a first adjustment module.

The first conversion module 601 is configured to convert an original image into an image to be processed under a specific scenario.

The first determination module 602 is configured to determine, in the image to be processed, a region to be adjusted of which image rendering state does not match scenario information of the specific scenario. The image rendering state of the region to be adjusted is related to light illuminated on a target object in the original image, and the target object includes a vehicle.

The second determination module 603 is configured to determine a target rendering state in the region to be adjusted. The target rendering state matching the scenario information.

The first adjustment module 604 is configured to adjust, in the image to be processed, the image rendering state of the region to be adjusted to the target rendering state, to obtain a target image.

In the above apparatus, the image rendering state includes the shadow rendering state. The second determination module 603 includes a first determination sub-module and a second determination sub-module.

The first determination sub-module is configured to determine, in the image to be processed, a reference region of which shadow rendering state matches the scenario information.

The second determination sub-module is configured to determine the shadow rendering state of the reference region as the target rendering state.

In the above apparatus, the first determination module 602 is further configured to perform the following operation.

In a case where the scenario information indicates a night scenario without a light source or a daytime scenario without sunshine, a shadow region in the image to be processed is determined as the region to be adjusted.

In the above apparatus, the first determination module 602 includes a third determination sub-module and a fourth determination sub-module.

The third determination sub-module is configured to, in a case where the scenario information indicates the night scenario with a light source or the daytime scenario with sunshine, determine, according to a direction in which light irradiates the target object, the shadow region capable of being generated by the target object.

The fourth determination sub-module is configured to determine a shadow region other than a first shadow region within the shadow region in the image to be processed as the region to be adjusted. The first shadow region is an intersection of the shadow region in the image to be processed and the shadow region capable of being generated by the target object.

In the above apparatus, the shadow rendering state of the reference region is a shadow-free state. The first adjustment module 604 includes a first adjustment sub-module.

The first adjustment sub-module is configured to adjust, in the image to be processed, an image of the region to be adjusted to be in a shadow-free state according to an image of the reference region, to obtain a target image.

In the above apparatus, the first adjustment sub-module includes a first adjustment unit, a first generation unit, and a second generation unit.

The first adjustment unit is configured to adjust a grayscale image of the region to be adjusted according to the image of the reference region, to obtain an adjusted gray scale map.

The first generation unit is configured to generate, based on the adjusted grayscale map, an image of a replacement region of which shadow rendering state is the shadow-free state.

The second generation unit is configured to replace, in the image to be processed, the image of the region to be adjusted with a generated image of the replacement region, to generate the target image.

In the above apparatus, the first adjustment unit includes a first determination sub-unit, a first adjustment sub-unit, and a second determination sub-unit.

The first determination sub-unit is configured to determine a histogram of the reference region according to the image of the reference region.

The first adjustment sub-unit is configured to adjust a histogram of the region to be adjusted based on the histogram of the reference region, to obtain an adjusted histogram.

The second determination sub-unit is configured to determine the adjusted grayscale map based on the adjusted histogram.

In the above apparatus, the image rendering state includes the shadow rendering state. The first determination module 602 includes a fifth determination sub-module and a sixth determination sub-module.

The fifth determination sub-module is configured to, in a case where the scenario information indicates the night scenario with a light source or the daytime scenario with sunshine, determine, according to a direction in which light irradiates the target object, a shadow region capable of being generated by the target object.

The sixth determination sub-module is configured to determine the shadow region capable of being generated by the target object as the region to be adjusted.

In the above apparatus, the first adjustment module 604 includes a seventh determination sub-module and a first rendering sub-module.

The seventh determination sub-module is configured to determine a light parameter in the specific scenario.

The first rendering sub-module is configured to determine, based on the light parameter, a light intensity of a surface of the target object that is able to generate the shadow region, and render the region to be adjusted to obtain the target image.

In the above apparatus, the original image is an image acquired without rain/snow, and the specific scenario is a rain/snow scenario. The first adjustment module 604 includes a first addition sub-module.

The first addition sub-module is configured to add raindrops/snowflakes in the original image, to obtain the target image.

It is to be noted that, the descriptions of the above apparatus embodiments are similar to descriptions about the method embodiments and beneficial effects similar to those of the method embodiments are achieved. For technical details that are not disclosed in the apparatus embodiments of the disclosure, refer to the descriptions of the method embodiments of the disclosure for understanding.

It is to be noted that, in the embodiments of the disclosure, if the above image generation method is implemented in the form of a software functional module and sold or used as an independent product, it can be stored in the computer-readable storage medium. Based on such an understanding, the technical solutions of the disclosure substantially or parts making contributions to some implementations may be embodied in form of a software product, and the computer software product is stored in a storage medium, including a plurality of instructions for causing a computer device (which may be a terminal, a server, or the like) to execute all or part of the method in each embodiment of the disclosure. The foregoing storage medium includes: a USB flash disk, a mobile Hard Disk Drive (HDD), a Read-Only Memory (ROM), and various media that can store program codes, such as a magnetic disk, or an optical disk. In this way, the embodiments of the disclosure are not limited to any specific combination of hardware and software.

Accordingly, an embodiment of the disclosure further provides a computer storage medium. The computer storage medium includes computer executable instructions. After the computer executable instructions are executed, operations in the image generation method provided in the embodiments of the disclosure can be implemented.

Correspondingly, an embodiment of the disclosure further provides a computer storage medium. The computer storage medium stores computer executable instructions. When the computer executable instructions are executed by a processor, operations of the image generation method provided in the above embodiments are implemented.

Figure 7:
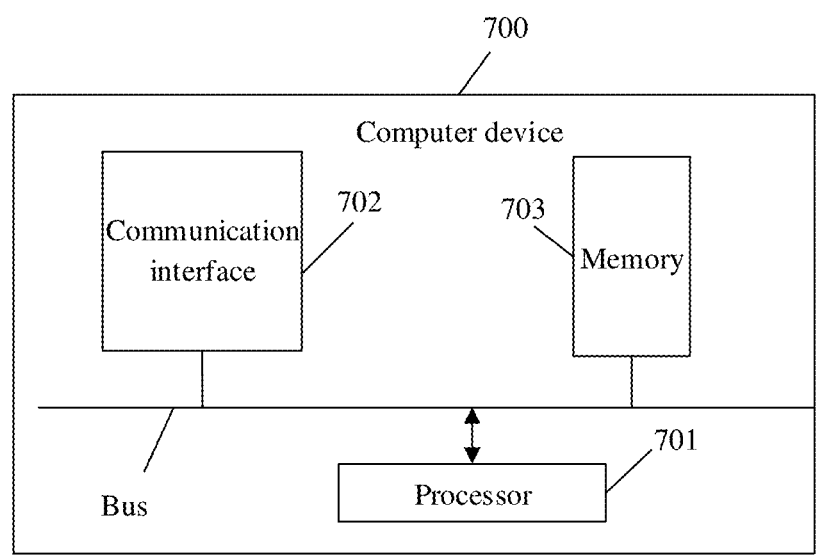
FIG. 7 is a schematic diagram of a composition structure of a computer device according to an embodiment of the disclosure.

Correspondingly, an embodiment of the disclosure provides a computer device. FIG. 7 is a schematic diagram of a composition structure of a computer device according to an embodiment of the disclosure. As shown in FIG. 7, the computer device 700 includes a processor 701, at least one communication bus, a communication interface 702, at least one external communication interface, and a memory 703. The communication interface 702 is configured to achieve connection communication between these assemblies. The communication interface 702 may include a display screen. The external communication interface may include a standard wired interface and wireless interface. The processor 701 is configured to execute an image processing program in the memory, to implement operations of the image generation method provided in the above embodiments.

The above descriptions of the image generation apparatus, computer device and storage medium embodiments are similar to the descriptions of the above method embodiments, and have similar technical descriptions and beneficial effects as the corresponding method embodiments. Due to space limitations, the description of the above method embodiments can be used, which is not described herein again. For technical details that are not disclosed in the image generation apparatus, the computer device and the storage medium embodiments of the disclosure, refer to the descriptions of the method embodiments of the disclosure for understanding.

It is to be understood that "one embodiment" and "an embodiment" mentioned in the whole specification mean that specific features, structures or characteristics related to the embodiment is included in at least one embodiment of the disclosure. Therefore, "in one embodiment" or "in an embodiment" appearing at any place of the whole specification does not always refer to the same embodiment. In addition, these specific features, structures or characteristics may be combined in one or more embodiments in any proper manner. It is to be understood that, in various embodiments of the disclosure, the sequence number of each process does not mean the sequence of execution. The execution sequence of each process should be determined by its functions and internal logic, which should not constitute any limitation on the implementation process of the embodiments of the disclosure. The serial numbers of the foregoing embodiments of the disclosure are merely for description, and do not represent the superiority or inferiority of the embodiments.

It is to be noted that terms "include" and "comprise" or any other variant thereof is intended to cover nonexclusive inclusions herein, so that a process, method, object or apparatus including a series of components not only includes those components but also includes other components which are not clearly listed or further includes components intrinsic to the process, the method, the object or the apparatus. Under the condition of no more limitations, a component defined by the statement "including a/an . . . " does not exclude existence of the same other components in a process, method, object or apparatus including the component.

In several embodiments provided by the disclosure, it is to be understood that the disclosed device and method may be implemented in other ways. The device embodiment described above is only schematic, and for example, division of the units is only logic function division, and other division manners may be adopted during practical implementation. For example, a plurality of units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part of all of the units may be selected according to a practical requirement to achieve the purposes of the solutions of the embodiments.

In addition, each functional unit in each embodiment of the disclosure may be integrated into a processing unit, each unit may also serve as an independent unit and two or more than two units may also be integrated into a unit. The integrated unit may be implemented in a hardware form and may also be implemented in form of hardware and software functional unit. Those of ordinary skill in the art should know that all or part of the operations of the method embodiment may be implemented by related hardware instructed through a program, the program may be stored in a computer-readable storage medium, and the program is executed to execute the operations of the method embodiment. The storage medium which may be a volatile storage medium includes: a mobile storage device, an ROM, and various media that can store program codes, such as a magnetic disk, or an optical disk.

Or, if the integrated unit is implemented in the form of the software functional unit and sold or used as an independent product, it can be stored in the computer readable storage medium. Based on such an understanding, the technical solutions of the embodiments of the disclosure substantially or parts making contributions to some implementations may be embodied in form of a software product, and the computer software product is stored in a storage medium, including a plurality of instructions for causing a computer device (which may be a personal computer, a server, a network device or the like) to execute all or part of the method in each embodiment of the disclosure. The foregoing storage medium includes a portable storage device, an ROM, and various media that can store program codes, such as a magnetic disk, or an optical disk. The above is only the specific implementations of the disclosure and not intended to limit the scope of protection of the disclosure. Any variations or replacements apparent to those skilled in the art within the technical scope disclosed by the disclosure shall fall within the scope of protection of the disclosure. Therefore, the protection scope of the disclosure shall be subject to the protection scope of the claims.

The embodiments of the disclosure provide the image generation method and apparatus, the device and the storage medium. The original image is converted into the image to be processed under the specific scenario. In the image to be processed, the region to be adjusted of which image rendering state does not match scenario information of the specific scenario is determined. The image rendering state of the region to be adjusted is related to light illuminated on a target object in the original image, and the target object includes a vehicle. The target rendering state in the region to be adjusted is determined. The target rendering state matches the scenario information. In the image to be processed, the image rendering state of the region to be adjusted is adjusted to the target rendering state, to obtain the target image.

The invention claimed is:

1. An image generation method, performed by an electronic device, the method comprising:
converting an original image into an image to be processed under a specific scenario;
determining, in the image to be processed, a region to be adjusted of which image rendering state does not match scenario information of the specific scenario, wherein the image rendering state of the region to be adjusted is related to light illuminated on a target object in the original image, and the target object comprises a vehicle;
determining a target rendering state in the region to be adjusted, wherein the target rendering state matches the scenario information; and
adjusting, in the image to be processed, the image rendering state of the region to be adjusted to the target rendering state, to obtain a target image,
wherein the image rendering state comprises a shadow rendering state; and the determining the target rendering state in the region to be adjusted comprises:
determining, in the image to be processed, a reference region of which shadow rendering state matches the scenario information; and
determining the shadow rendering state of the reference region as the target rendering state, and
wherein the determining, in the image to be processed, the region to be adjusted of which image rendering state does not match scenario information of the specific scenario comprises:
in a case where the scenario information indicates a night scenario without a light source or a daytime scenario without sunshine, determining a shadow region in the image to be processed as the region to be adjusted.

2. The method of claim 1, wherein the determining, in the image to be processed, the region to be adjusted of which image rendering state does not match scenario information of the specific scenario comprises:
in a case where the scenario information indicates a night scenario with a light source or a daytime scenario with sunshine, determining, according to a direction in which light irradiates the target object, a shadow region capable of being generated by the target object; and
determining a shadow region other than a first shadow region within the shadow region in the image to be processed as the region to be adjusted, wherein the first shadow region is an intersection of the shadow region in the image to be processed and the shadow region capable of being generated by the target object.

3. The method of claim 1, wherein the shadow rendering state of the reference region is a shadow-free state; and the adjusting, in the image to be processed, the image rendering state of the region to be adjusted to the target rendering state, to obtain the target image comprises:
adjusting, in the image to be processed, an image of the region to be adjusted to be in a shadow-free state according to an image of the reference region, to obtain the target image.

4. The method of claim 3, wherein the adjusting, in the image to be processed, the image of the region to be adjusted to be in the shadow-free state according to the image of the reference region, to obtain the target image comprises:
adjusting a grayscale image of the region to be adjusted according to the image of the reference region, to obtain an adjusted grayscale map;
generating, based on the adjusted grayscale map, an image of a replacement region of which shadow rendering state is the shadow-free state; and
replacing, in the image to be processed, the image of the region to be adjusted with a generated image of the replacement region, to generate the target image.

5. The method of claim 4, wherein the adjusting the grayscale image of the region to be adjusted according to the image of the reference region, to obtain the adjusted grayscale map comprises:
determining a histogram of the reference region according to the image of the reference region;
adjusting a histogram of the region to be adjusted based on the histogram of the reference region, to obtain an adjusted histogram; and
determining the adjusted grayscale map based on the adjusted histogram.

6. The method of claim 1, wherein the image rendering state comprises a shadow rendering state, and the determining, in the image to be processed, the region to be adjusted of which image rendering state does not match the scenario information comprises:
  in a case where the scenario information indicates a night scenario with a light source or a daytime scenario with sunshine, determining, according to a direction in which light irradiates the target object, a shadow region capable of being generated by the target object; and
  determining the shadow region capable of being generated by the target object as the region to be adjusted.

7. The method of claim 6, wherein the adjusting, in the image to be processed, the image rendering state of the region to be adjusted to the target rendering state, to obtain the target image comprises:
  determining a light parameter in the specific scenario; and
  determining, based on the light parameter, a light intensity of a surface of the target object that is able to generate the shadow region, and rendering the region to be adjusted to obtain the target image.

8. The method of claim 1, wherein the original image is an image acquired without rain/snow, and the specific scenario is a rain/snow scenario, and
  the adjusting, in the image to be processed, the image rendering state of the region to be adjusted to the target rendering state, to obtain the target image comprises:
  adding raindrops/snowflakes in the original image, to obtain the target image.

9. An image generation apparatus, comprising:
  a memory storing processor-executable instructions; and
  a processor configured to execute the stored processor-executable instructions to perform operations of:
  converting an original image into an image to be processed under a specific scenario;
  determining, in the image to be processed, a region to be adjusted of which image rendering state does not match scenario information of the specific scenario, wherein the image rendering state of the region to be adjusted is related to light illuminated on a target object in the original image, and the target object comprises a vehicle;
  determining a target rendering state in the region to be adjusted, wherein the target rendering state matches the scenario information; and
  adjusting, in the image to be processed, the image rendering state of the region to be adjusted to the target rendering state, to obtain a target image,
  wherein the image rendering state comprises a shadow rendering state; and the determining the target rendering state in the region to be adjusted comprises:
  determining, in the image to be processed, a reference region of which shadow rendering state matches the scenario information; and
  determining the shadow rendering state of the reference region as the target rendering state, and
  wherein the determining, in the image to be processed, the region to be adjusted of which image rendering state does not match scenario information of the specific scenario comprises:
  in a case where the scenario information indicates a night scenario without a light source or a daytime scenario without sunshine, determining a shadow region in the image to be processed as the region to be adjusted.

10. The apparatus of claim 9, wherein the determining, in the image to be processed, the region to be adjusted of which image rendering state does not match scenario information of the specific scenario comprises:
  in a case where the scenario information indicates a night scenario with a light source or a daytime scenario with sunshine, determining, according to a direction in which light irradiates the target object, a shadow region capable of being generated by the target object; and
  determining a shadow region other than a first shadow region within the shadow region in the image to be processed as the region to be adjusted, wherein the first shadow region is an intersection of the shadow region in the image to be processed and the shadow region capable of being generated by the target object.

11. The apparatus of claim 9, wherein the shadow rendering state of the reference region is a shadow-free state; and the adjusting, in the image to be processed, the image rendering state of the region to be adjusted to the target rendering state, to obtain the target image comprises:
  adjusting, in the image to be processed, an image of the region to be adjusted to be in a shadow-free state according to an image of the reference region, to obtain the target image.

12. The apparatus of claim 11, wherein the adjusting, in the image to be processed, the image of the region to be adjusted to be in the shadow-free state according to the image of the reference region, to obtain the target image comprises:
  adjusting a grayscale image of the region to be adjusted according to the image of the reference region, to obtain an adjusted grayscale map;
  generating, based on the adjusted grayscale map, an image of a replacement region of which shadow rendering state is the shadow-free state; and
  replacing, in the image to be processed, the image of the region to be adjusted with a generated image of the replacement region, to generate the target image.

13. The apparatus of claim 12, wherein the adjusting the grayscale image of the region to be adjusted according to the image of the reference region, to obtain the adjusted grayscale map comprises:
  determining a histogram of the reference region according to the image of the reference region;
  adjusting a histogram of the region to be adjusted based on the histogram of the reference region, to obtain an adjusted histogram; and
  determining the adjusted grayscale map based on the adjusted histogram.

14. The apparatus of claim 9, wherein the image rendering state comprises a shadow rendering state, and the determining, in the image to be processed, the region to be adjusted of which image rendering state does not match the scenario information comprises:
  in a case where the scenario information indicates a night scenario with a light source or a daytime scenario with sunshine, determining, according to a direction in which light irradiates the target object, a shadow region capable of being generated by the target object; and
  determining the shadow region capable of being generated by the target object as the region to be adjusted.

15. The apparatus of claim 14, wherein the adjusting, in the image to be processed, the image rendering state of the region to be adjusted to the target rendering state, to obtain the target image comprises:
  determining a light parameter in the specific scenario; and
  determining, based on the light parameter, a light intensity of a surface of the target object that is able to generate the shadow region, and rendering the region to be adjusted to obtain the target image.

16. A non-transitory computer-readable storage medium having stored thereon computer-executable instructions that, when executed by a processor, cause the processor to implement operations of:
converting an original image into an image to be processed under a specific scenario;
determining, in the image to be processed, a region to be adjusted of which image rendering state does not match scenario information of the specific scenario, wherein the image rendering state of the region to be adjusted is related to light illuminated on a target object in the original image, and the target object comprises a vehicle;
determining a target rendering state in the region to be adjusted, wherein the target rendering state matches the scenario information; and
adjusting, in the image to be processed, the image rendering state of the region to be adjusted to the target rendering state, to obtain a target image,
wherein the image rendering state comprises a shadow rendering state, and the determining the target rendering state in the region to be adjusted comprises:
determining, in the image to be processed, a reference region of which shadow rendering state matches the scenario information; and
determining the shadow rendering state of the reference region as the target rendering state, and
wherein the determining, in the image to be processed, the region to be adjusted of which image rendering state does not match scenario information of the specific scenario comprises:
in a case where the scenario information indicates a night scenario without a light source or a daytime scenario without sunshine, determining a shadow region in the image to be processed as the region to be adjusted.

* * * * *